Figure 2:
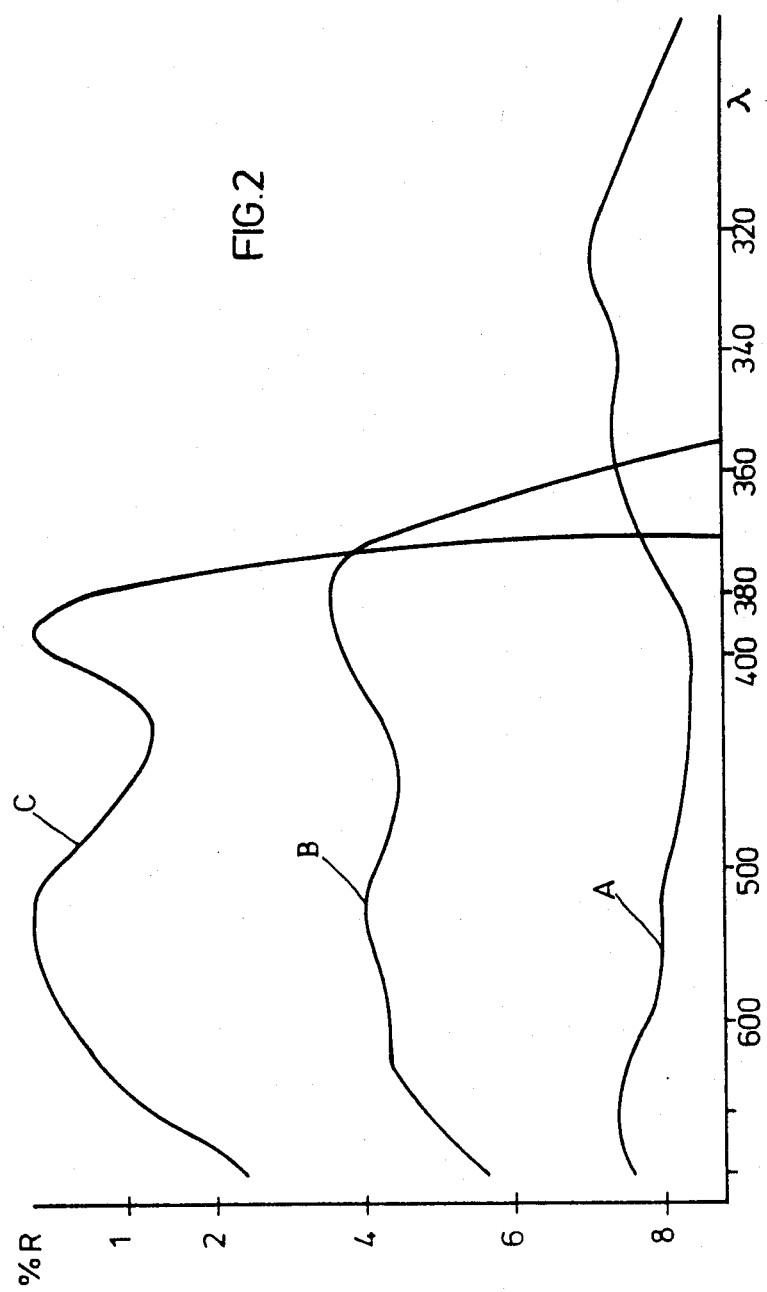

United States Patent [19]

Wank et al.

[11] Patent Number: 4,725,109

[45] Date of Patent: Feb. 16, 1988

[54] TRANSPARENT COVERING HAVING AN ANTIREFLECTION COATING FOR SIGNS, IN PARTICULAR FOR DISPLAY DEVICES

[75] Inventors: Joachim Wank, Dormagen; August Hell, Feldkirchen, both of Fed. Rep. of Germany

[73] Assignee: Bayer Aktiengesellschaft, Fed. Rep. of Germany

[21] Appl. No.: 795,864

[22] Filed: Nov. 7, 1985

[30] Foreign Application Priority Data

Nov. 16, 1984 [DE] Fed. Rep. of Germany ....... 3441948

[51] Int. Cl.$^4$ ................................................ G02B 5/22
[52] U.S. Cl. ...................................... 350/1.6; 350/1.7; 350/166
[58] Field of Search ............... 428/212, 213, 412, 446, 428/699, 701, 913; 350/1.6, 1.7, 166

[56] References Cited

U.S. PATENT DOCUMENTS 4,265,991  5/1981  Hirai et al. .......................... 430/64

FOREIGN PATENT DOCUMENTS 116003  9/1981  Japan .................... 428/412

*Primary Examiner*—John E. Kittle
*Assistant Examiner*—P. R. Schwartz
*Attorney, Agent, or Firm*—Connolly & Hutz

[57] ABSTRACT

A layer (2) of a substance of high refractive index having an optical thickness of $$\frac{\lambda_1}{8}$$

and a layer (3) of a substance of low refractive index having an optical thickness of $$\frac{\lambda_1}{8}$$

as well as a layer (4) of a substance of high refractive index having an optical thickness of $$\frac{\lambda_2}{2}$$

and a layer (5) of a substance of low refractive index having an optical thickness of $$\frac{\lambda_2}{4}$$

are arranged as an antireflection coating on a transparent covering (1) of display devices, the wavelengths $\lambda_1$ and $\lambda_2$ being in a ratio of 1:1,5 to 1:3.

5 Claims, 2 Drawing Figures

| | |
|---|---|
| Si O$_2$ | 5 |
| Ti O$_2$ | 4 |
| Si O$_2$ | 3 |
| Ti O$_2$ | 2 |
| Polycarbonat | 1 |
| Ti O$_2$ | 6 |
| Si O$_2$ | 7 |
| Ti O$_2$ | 8 |
| Si O$_2$ | 9 |

| | |
|---|---|
| SiO$_2$ | 5 |
| TiO$_2$ | 4 |
| SiO$_2$ | 3 |
| TiO$_2$ | 2 |
| Polycarbonat | 1 |
| TiO$_2$ | 6 |
| SiO$_2$ | 7 |
| TiO$_2$ | 8 |
| SiO$_2$ | 9 |

FIG. 1

TRANSPARENT COVERING HAVING AN ANTIREFLECTION COATING FOR SIGNS, IN PARTICULAR FOR DISPLAY DEVICES

The invention relates to a transparent covering having an anti-reflection coating for signs, in particular for display devices, consisting of a base material and an anti-reflection coating. Sensitive articles, in particular instruments, are covered by transparent screens to avoid contamination and mechanical damage, but these transparent screens often prevent perfect reading under certain lighting conditions due to reflection.

The surface of the transparent coverings has been rendered matt, for example, to avoid these undesirable reflections. This concept of roughening can only be applied, however, if the signs to be displayed lie directly behind the screen because definition and therefore legibility diminishes as the distance between the sign and the covering increases.

Curved covering screens composed, for example, of polymethylacrylate are also used for motor vehicle display instruments. The curvature is designed such that the driver's eye is located approximately in the focal point. However, this is frequently not the case after individual adjustment of the seat so that the accuracy of reading and therefore safety suffers, in particular, under greatly varying lighting conditions. Moreover, curved covering screens necessitate greater construction thicknesses and this makes it difficult to provide the compact structure frequently desired.

It is an object of the invention to find a low-reflection, closed covering having an insensitive surface and necessitating a minimal construction thickness which allows clearly defined reproduction of the signs and images lying behind it even under greatly varying lighting conditions from a broad spectrum of viewing points.

Accordingly the present invention provides a transparent covering for signs in particular for display devices, having an antireflection coating, consisting of a base material and an antireflection coating, wherein as an antireflection coating on at least one side of the base material there are arranged a layer of a substance of high refractive index having an optical thickness of $$\frac{\lambda_1}{8}$$

and a layer of a substance of low refractive index having an optical thickness of $$\frac{\lambda_1}{8}$$

as well as a layer of a substance of refractive index having an optical thickness of $$\frac{\lambda_2}{2}$$

and a layer of a substance of low refractive index having an optical thickness of $$\frac{\lambda_2}{4}$$

the wavelengths $\lambda_1$ and $\lambda_2$ being in a ratio of 1:2 to 1:3.

It is surprising for a person skilled in the art that a substantially non-reflective, sharply defined view of the signs behind the transparent film can be achieved if the layers are applied under vacuum under reactive oxidizing conditions from, for example, $Ti_2O_3$; $SiO_2$ in the above-mentioned sequence.

For applications of visual screen dereflection which serve both to increase contrast and to eliminate undesirable reflections, the optical thickness of the layers is selected in such a way that the dereflection is optimised for light impinging on the screen with an angle of incidence $I = 13 \pm 3°$, that is an angle between the vertical to the plane of reflection and the incident light ray. This has the advantage that satisfactory elimination of reflection is achieved even during lateral inspection.

A further advantage resides in the fact that the covering necessitates only a small construction thickness so it can be used in structurally restricted conditions.

In a particular embodiment, $\lambda_1$ lies within or directly below the end of the short-wave range and $\lambda_2$ lies in the medium-wave (from 40 to 60% of the total range), or long-wave range of the spectrum to be considered for dereflection purposes.

Good results are achieved if the wave length $\lambda_1$ lies in the range of from 275 to 450 nm and the wavelength $\lambda_2$ in the range of 500 to 850 nm.

In a further embodiment, antireflection coatings having differing wavelengths or wavelength ratios $$\frac{\lambda_{1i}}{\lambda_{2i}}$$

respectively $$\frac{\lambda_{1j}}{\lambda_{2j}}$$

are arranged on opposing sides of the base material.

When applying antireflection coatings of which the optical layer thicknesses on the two sides of the transparent film correspond to differing wavelengths $\lambda_{1i}$ and $\lambda_{2i}$ resp.

$$\frac{\lambda_{1j}}{\lambda_{2j}}$$

dereflection can be made even more neutral. At the same time, the wavelengths $\lambda_{1i}$ and $\lambda_{2i}$ resp.

$$\frac{\lambda_{1j}}{\lambda_{2j}}$$

can come closer to one another in order to dereflect a particularly undesirable close range of the spectrum to an optimum.

In a further embodiment, the high refractivity dielectric substance is composed of $TiO_2$ and the low refractivity dielectric substance of $SiO_2$.

These substances, which can be produced also by reactive vaporization of $Ti_2O_3$ and $SiO$ have proven suitable and are distinguished by high scratch resistance. However, combinations with $MgF_2$ and $Ta_2O_5$ are also conceivable. Furthermore differing material combinations can be used on either side of the base.

In one embodiment, a polycarbonate film is used as base material.

This film has high permeability to light and high strength.

Polycarbonates which are to be stabilised according to the invention include the polycondensates obtainable by reaction of diphenols, in particular of dihydroxydiaryl alkanes with phosgene or diesters of carbonic acid, wherein dihydroxydiaryl alkanes of which the aryl radicals bear methyl groups or halogen atoms in the o- and/or m-position to the hydroxyl group are also suitable in addition to the unsubstituted dihydroxydiaryl alkanes. Branched polycarbonates are also suitable.

The polycarbonates to be stabilized have average mean-weight-molecular weights $\overline{M}w$ of between 10,000 and 100,000, preferably between 20,000 and 40,000, determined by measuring the relative viscosity in $CH_2Cl_2$ at 25° C. and at a concentration of 0.5 g per 100 ml.

Suitable diphenols include, for example, hydroquinone, resorcinol, 4,4-dihydroxydiphenyl, bis-(hydroxyphenyl)alkanes such as $C_1$–$C_8$-alkylene and $C_2$–$C_8$-alkylidenebisphenols, bis-(hydroxyphenyl)-cycloalkanes such as $C_5$–$C_{15}$-cycloalkylene and $C_5$–$C_{15}$-cycloalkylidene bisphenols, bis-(hydroxy-phenyl)-sulphides, ethers, ketones, sulphoxides or sulphones. Also $\alpha,\alpha$-bis(hydroxy-phenyl)-diisopropylbenzene as well as the corresponding nuclear-alkylated or nuclear-halogenated compounds. Polycarbonates based on bis-(4-hydroxy-phenyl)-propane-2.2 (Bisphenol A), bis-(4-hydroxy-3,5-dichlorophenyl)-propane-2.2 (Tetrachloro-bisphenol A), bis-(4-hydroxy-3,5-dibromphenyl)-propane-2.2 (Tetrabrombisphenol A), bis-(4-hydroxy-3,5-dimethyl-phenyl)-propane-2.2 (Tetramethyl-bisphenol A), bis-(4-hydroxy-phenyl)-cyclohexane-1.1 (Bisphenol Z) and based on trinuclear bisphenols such as $\alpha,\alpha'$-bis-(4-hydroxyphenyl)-p-diisopropylbenzene are preferred.

An example of the invention is illustrated in the drawings and is described in more detail below.

| FIG. 1 | Layer structure |
|---|---|
| FIG. 2 | Graph |

FIG. 1 shows a base film 1 composed of polycarbonate onto which successive layers are applied by vaporization in mechanical thickness $TiO_2$ 14 nm (2), $SiO_2$ 25 nm (3), $TiO_2$ 134 nm (4) and $SiO_2$ 105 nm (5); wavelengths of $\lambda_1 = 315$ nm and $\lambda_2 = 613$ nm, a ratio $$\frac{\lambda_1}{\lambda_2}$$

$= 1.9$ being selected.

This antireflection system can be complemented by a further antireflection system on the other side of the film in layers of $TiO_2$ 16 nm (6), $SiO_2$ 30 nm (7), $TiO_2$ 119 nm (8) and $SiO_2$ 91 nm (9), maximum residual reflection on one side coinciding with minimum residual reflection on the other side.

Dereflection falling into the long-wave visible and near infrared range is produced using $TiO_2$ 22 nm, $SiO_2$ 37 nm, $TiO_2$ 161 nm and $SiO_2$ 121 nm with wavelengths $\lambda_1 = 435$ nm and $\lambda_2 = 710$ nm.

FIG. 2 shows a graph in which the wavelength $\lambda$ is plotted on the abscissa and the degree of reflection R on the ordinate. Curve A shows the reflection on an uncoated film. Curve B shows the reflection of a film coated on one side. Curve C represents the reflection by a film coated on both sides. As a result, it can be seen that the reflection in the visible range is substantially reduced from a wavelength of 390 nm upwards.

EXAMPLE 1

A 600 $\mu$m thick transparent film of polycarbonate is vaporized on both sides by the process according to the invention so that a $$\frac{\lambda_1}{8}$$

optical layer of $TiO_2$ is firstly applied then a $$\frac{\lambda_1}{8}$$

optical layer of $SiO_2$. A $$\frac{\lambda_2}{4}$$

optical layer of $TiO_2$ and a $$\frac{\lambda_2}{2}$$

optical layer of $SiO_2$ follow them.

The individual layers are applied, for example, in a strip vaporizing installation with 4 respective vaporizers arranged on each side of the film.

The film which has thus received an antireflection coating on both sides is used as a covering for the display instrument in a passenger car having four different individual instruments in its housing. The distance between film and indicators is 1 cm. The film is fixed to the housing in that the outer rim has some 3 mm ⌀ holes arranged at intervals of 100 mm. The film which forms a seal flush with the outer rim has corresponding perforations at the same position. A 10 mm wide frame with walls 4 mm thick which can therefore be provided with pins which are able to pass into the holes provided in the lower portion of the housing is used as closure means. The film provided with an antireflection coating is clamped between housing and covering frame by rivetting the covering frame to the lower housing portion. The depth of this display instrument is 100 mm less than that of the earlier ones having a curved screen covering.

EXAMPLE 2

A covering for a multi-purpose instrument for a passenger car according to Example 1 wherein the film is joined to the lower housing portion by adhesion with an epoxide resin.

EXAMPLE 3

A 100 $\mu$m thick film of polycarbonate having a antireflection coating according to Example 1 on one side is laminated onto a flat 3 mm thick plate of polymethacrylate in such a way that a UV-hardenable resin based on acrylate is applied to the plate composed of PMMA. The film is applied by the uncoated side so that no air is enclosed between film and resin. The adhesive is then initially hardened by irradiation with UV light. The self-supporting plate can be cut to the required size and clipped into the housing of the display device.

EXAMPLE 4

In accordance with Example 3, except that the plate of PMMA is laminated on both sides with a film of polycarbonate having received an antireflection coating on one side.

EXAMPLE 5

A 100 μm thick film of polycarbonate is coated on one side in accordance with Example 1 using SiO$_2$ as a substance of low refracture index and TiO$_2$ as a substance of high refractive index (B).

This film of polycarbonate having an antireflection coating on one side is inserted into the mould cavity of an injection moulding tool in such a way that the side having an antireflection coating points towards the external wall of the mould. The film is injected with a transparent plastic, for example polycarbonate, backing in known manner.

We claim:

1. A transparent covering for signs, in particular for display devices, comprising a layer of base material and an anti-reflection coating on at least one side of the base material, said coating comprising a layer contacting the base material of a substance of a high refractive index having an optical thickness of $$\frac{\lambda_1}{8},$$

followed by a layer of substance of low refractive of $$\frac{\lambda_1}{8}$$

and then by a layer of substance of high refractive index having an optical thickness of $$\frac{\lambda_2}{2}$$

and then by a layer of a substance of low refractive index having an optical thickness of $$\frac{\lambda_2}{4},$$

the wavelengths $\lambda_1$ and $\lambda_2$ being in the ratio of 1:1.5 to 1:3.

2. A transparent covering according to claim 1 wherein $\lambda_1$ lies in or directly below the end of the shortwave range and $\lambda_2$ lies in the end of the medium-wave (40 to 60% of the total) or longwave range of the total spectrum range to be considered for dereflection purposes.

3. A transparent covering according to claim 1 wherein antireflection coatings are arranged on the opposing sides of the base material, said coatings having differing wavelengths or wavelength ratio.

4. A transparent covering according to any of claims 1 to 3, wherein the high refractivity substance is composed of TiO$_2$ and the low refractivity substance is composed of SiO$_2$.

5. A transparent covering according to claim 1 wherein the base material is polycarbonate.

* * * * *